United States Patent Office 3,364,183
Patented Jan. 16, 1968

3,364,183
N,N-BIS-ACRYLAMIDOACETIC COMPOUNDS, THEIR METHOD OF MANUFACTURE AND THEIR APPLICATIONS
Pierre Talet, Alfortville, and Robert Behar, Paris, France, assignors to Nobel-Bozel, Paris, France, a joint-stock company
No Drawing. Filed June 8, 1965, Ser. No. 466,142
Claims priority, application France, June 9, 1964, 977,605
51 Claims. (Cl. 260—79.3)

The present invention relates to new N-N-bis-acrylamido-acetic compounds having very valuable properties for a number of industrial fields.

The compounds according to the invention have the following general formula:

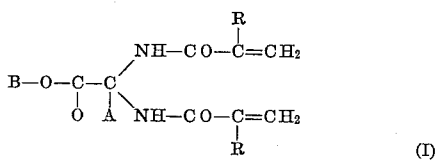
(I)

In this formula, A represents an atom of hydrogen or an alkyl group (such as a methyl, ethyl, or isopropyl residue); R represents an atom of hydrogen or a methyl residue; B represents an atom of hydrogen or an atom of metal or a hydrocarbon residue such as an aliphatic hydrocarbon residue; the atom of metal may be monovalent (potassium, sodium) or polyvalent (cobalt, lead); the aliphatic hydrocarbon residue may be linear or branched, saturated or unsaturated, and, when so required, substituted by an inorganic group such as —HSO$_3$, —NaSO$_3$, —NaSO$_4$, —OH.

Amongst the new products forming the object of the invention, there will more particularly be cited:

bis-acrylamido-acetic acid (=BAAA):

HO—CO—C(NH—CO—CH=CH$_2$)$_2$
|
H

α-methyl bis-acrylamido-acetic acid (=MBAA):

HO—CO—C(NH—CO—CH=CH$_2$)$_2$
|
CH$_3$ n-butyl bis-acrylamido-acetate (=BBAA):

CH$_3$—CH$_2$—CH$_2$—CH$_2$—O—CO—CH
                           (NH—CO—CH=CH$_2$)$_2$

Allyl bis-acrylamido-acetate (A=BAA):

CH$_2$=CH—CH$_2$—O—CO—CH(NH—CO—CH=CH$_2$)$_2$ 2 ethyl-hexyl bis-acrylamido-acetate (=EBAA):

CH$_3$—(CH$_2$)$_3$—CH—CH$_2$—O—CO—CH(NH—CO—CH=CH$_2$)$_2$
           |
          C$_2$H$_5$

Lauryl bis-acrylamido-acetate (=LBAA):

CH$_3$—(CH$_2$)$_{11}$—O—CO—CH(NH—CO—CH=CH$_2$)$_2$

Sulpho-12 lauryl bis-acrylamido-acetate:

HO$_3$S—CH$_2$—CH$_2$)$_{11}$—O—CO—CH
                       (NH—CO—CH=CH$_2$)$_2$

Oleyl bis-acrylamido-acetate (=OBAA):

CH$_3$—(CH$_2$)$_7$—CH=CH—(CH$_2$)$_7$—CH$_2$—O
              —CO—CH(NH—CO—CH=CH$_2$)$_2$

Sulpho-9 hydroxy-10 oleyl bis-acrylamido-acetate:

CH$_3$-(CH$_2$)$_7$-CH—CH-(CH$_2$)$_7$-CH$_2$-O-CO-CH(NH-CO-CH=CH$_2$)$_2$
            |   |
           OH  SO$_3$H

Sulpho-3 propyl bis-acrylamido-acetate:

HO$_3$S—CH$_2$—CH$_2$—CH$_2$—O—CO—CH
                           (NH—CO—CH=CH$_2$)$_2$

The metallic salts of bis-acrylamido-acetic acid: salts of sodium, potassium, cobalt, lead.

In the following description, there will be designated by free bis-acrylamido-acetic acids of the invention the bis-acrylamido-acetic acid itself (BAAA) and its substitution derivatives on the atom of carbon in α position with respect to the carboxyl group (and therefore the products such as MBAA).

The new compounds according to the invention, a non-restrictive list of which has been indicated above, are industrial products of great value: by virtue of their tensio-active properties, they can be utilized either directly as new detergents or as addition products for improving the properties of commercial detergent compositions. Thus, in the state of alkaline sulphonates, the 12-sulphonated poduct of LBAA, the 9-sulphonated 10-hydroxylated product OBAA, and the 3-sulphonated product of propyl bis-acrylamido-acetate are remarkable detergents; the non-ionic products BBAA, ABAA, EBAA, LBAA and OBAA are valuable as additives to detergent compositions since they permit a more stable foam to be obtained; finally, the BAAA and MBAA, in the state of sodium salts for example, added to detergent compositions, increase their foaming power and in a general way, their effectiveness.

On the other hand, the product according to the invention can be polymerized or co-polymerized, giving rise to new resins: bis-acrylamido-acetic acid for example, provides an insoluable and non-melting homo-polymer; the co-polymerization of ethyl acrylate with oleyl bis-acrylamido-acetate gives a very flexible resin with siccative properties; by co-polymerization of acrylamide with bis-acrylamido-acetic acid, there are obtained products which can be used as flocculants of suspensions or dispersions of all kinds, as thickeners, glues, protective colloids in the preparation of emulsions, especially for the paper industry, for textile dressings, etc.

For the preparation of the free bis-acrylamido-acetic acids of the invention, acrylamide is caused to react, in a strongly acid medium, with an α-carbonylated acid such as glyoxalic acid, pyruvic acid, methyl-pyruvic acid, dimethyl-pyruvic acid, in such manner as to obtain the condensation of one molecule of α-carbonyl acid with two molecules of acrylamide and elimination of one molecule of water, following the reaction:

HOOC—C=O+2H$_2$N.CO—CH=CH$_2$ ⟶
       |
       A

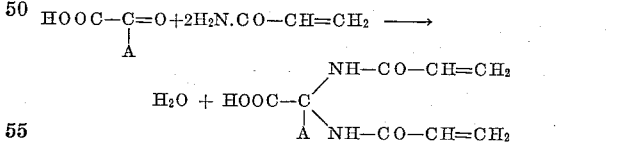

The difficulty in obtaining this condensation is the prevention of the polymerization of the acrylamide during the operation.

Now, it has been found that it is easily possible to obtain this condensation if the operation is carried out in the presence of an organic solvent permitting the elimination of the water of reaction (and, if this exists, the water of crystallization) by azeotropic way. This solvent should furthermore comply with the following conditions: It must form an azeotrope fairly rich in water; it must constitute a good solvent in the hot sate for the α-carbonyl acid and acrylamide mixture; it must not dissolve the condensation product; it must be inert with respect to sulphuric acid and it must not give rise to secondary reactions.

Amongst the solvents which are suitable for carrying out the said condensation, benzene should be cited.

The free bis-acrylamido-acetic acids obtained can be readily esterified, salified, etc., which makes it possible to obtain the other products of the invention.

The products according to the invention are furthermore valuable agents in chemical synthesis, since they permit various reactions, such as: methylation, addition of compounds with mobile hydrogen (alcohols, phenols, amines, ethylene-imine, mercaptans, sodium bisulphite, . . .), Diels-Alder reactions, etc.

The examples which follow are given for the purpose of illustrating the invention, on the one hand as regards the preparation of a certain number of new compounds according to the invention, on the other hand as regards some of their applications.

Example 1.—Preparation of BAAA

In an apparatus provided with a heating device, a cooler and a decantation device permitting the return of a solvent non-miscible with water, serving as a carrier for water, there are introduced:

|  | Grams |
|---|---|
| 98% acrylamide _____(4 mols)__ | 288 |
| 80% glyoxylic acid _____(2 mols)__ | 184 |
| Technical benzene _____ | 1700 |

There is added as a stabilizing agent:

Powdered crystallized copper acetate_____(1.8%)__  5.2 and the mixture is acidified with:

96% sulphuric acid _____  10.2

The reaction temperature is 75° C. at the start and 79° C. at the end of the operation.

In 4 hours, 68 cm.³ of water are collected with 250 cm.³ of benzene.

The product begins to precipitate as soon as the reaction water appears in the decanter.

After a period of rest at −2° C., the precipitate is filtered and dried for 8 hours at 60° C. The yield is 95%.

The crude product contains as impurities, copper, acrylamide and glyoxylic acid which have not been converted.

The product is washed twice with cold water under agitation, and after filtration it is treated while hot with 1350 grams of methanol.

During cooling, 216 grams of pure product, free from copper, are deposited.

The determination of the acidity shows 99% of pure product. The determination of the double bonds corresponds to 2 double bonds per molecule.

For certain applications in which the copper can be left in, this purification is not necessary, which enables the substantial losses due to this purification to be avoided.

In this preparation, the benzene can be replaced by another organic solvent, provided that this:

(1) forms an azeotrope fairly rich in water;
(2) constitutes a good solvent in the hot state for the mixture of acrylamide and glyoxylic acid;
(3) does not dissolve the BAAA;
(4) is inert with respect to sulphuric acid and does not give rise to secondary reactions.

On the other hand, if it is possible to agree to increase the duration of the reaction, it is possible to omit the sulphuric acid.

The colourless crystals obtained melt at 215° C. with decomposition.

Bis-acrylamido-acetic acid, only slightly soluble in water, is a remarkable auxiliary product for detergent compositions.

It can also be employed in the state of metallic salt such as the sodium salt.

On the other hand, by a standard technique of methylation by means of formaldehyde, it is converted to the N-monomethylol derivative, very soluble in water. The product obtained has the following characteristics:

|  | Found | Calculated |
|---|---|---|
| Content of nitrogen, percent | 11.8 | 12.2 |
| Number of double bonds per 100 grams of product | 0.84 | 0.88 |
| Number of molecules of formaldehyde reacted per molecule of BAAA | 0.99 | 1 |

Example 2.—α-Methyl bis-acrylamido-acetic acid (=MBAA)

In a vessel provided with a stirrer and a cooler with azeotropic decantation, there are introduced:

| Pyruvic acid (1 mol) _____grams__ | 88 |
|---|---|
| 98% acrylamide (2 mols) _____do____ | 145 |
| Benzene _____cm.³__ | 500 |
| Sulphuric acid, 66° Baumé _____grams__ | 5 |
| Copper acetate _____do____ | 2 |

The mixture is brought to boiling point and after three hours reaction, 18 cm.³ of water are recovered.

After cooling to 5° C., the crystallized product obtained is separated by filtration and they re-crystallized in a 50/50 mixture of methanol and water.

The yield is 51.4%.

The product is obtained in the form of colourless crystals melting with decomposition at 217° C.; the chemical analysis indicates the formula $C_9H_{12}O_4N_2$ which is thus that of α-methyl bis-acrylamido acetic acid.

The product has the following characteristics:

|  | Found | Calculated |
|---|---|---|
| Content of nitrogen, percent | 13.6 | 13.2 |
| Number of double bonds per 100 grams | 0.92 | 9.94 |
| Number of COOH groups per 100 grams | 0.45 | 0.47 |

Example 3.—Butyl bis-acrylamido-acetate (=BBAA)

In a vessel provided with a stirrer and a cooler with azeotropic decantation, there are introduced:

|  | Parts |
|---|---|
| Bis-acrylamido-acetic acid _____ | 200 |
| Butanol _____ | 250 |
| Benzene _____ | 1200 |
| Sulphuric acid, 66° Baumé _____ | 22 |

The mixture is brought to boiling for 6 hours and 30 cm.³ of water are collected.

After cooling to 5° C., the precipitate is filtered and is re-crystallized in butanol.

There are thus obtained 160 parts of pure product having the following characteristics:

| Melting point _____° C__ | 210 |
|---|---|
| Yield of pure product _____percent__ | 63 |

Example 4.—Allyl bis-acrylamido acetate (=ABAA)

In a vessel provided with a stirrer and a cooler with azeotropic decantation, there are introduced:

|  | Parts |
|---|---|
| Bis-acrylamido-acetic acid (1 mol) _____ | 200 |
| Allyl alcohol (1.5 mols) _____ | 87 |
| Benzene _____ | 1700 |
| Copper acetate _____ | 2.5 |
| Sulphuric acid, 66° Baumé _____ | 22 |

The mixture is brought to boiling, and after 6 hours reaction 24 cm.³ of water are collected.

After cooling to 5° C., filtration and re-crystallization of the precipitate in alcohol, there are obtained 166 parts of pure product having the following characteristics:

| Melting point _____° C__ | 198 |
|---|---|
| Yield of re-crystallized product _____percent__ | 70 |

Example 5.—2-ethyl-hexyl bis-acrylamido-acetate (=EBAA)

Into a vessel provided with a stirrer and a cooler with azeotropic decantation, there are introduced:

| | Parts |
|---|---|
| Bis-acrylamido-acetic acid | 200 |
| Ethyl-2-hexyl alcohol | 195 |
| Benzene | 1200 |
| Sulphuric acid 66° Baumé | 22 |

The mixture is brought up to boiling, and after 5 hours reaction 23 cm.³ of water are collected.

After cooling to 5° C., the deposit is filtered and washed with benzene and alcohol. By re-crystallization in alcohol, there are obtained 232 parts of a product having the following characteristics:

| | | |
|---|---|---|
| Melting point | ° C | 150–151 |
| Double bonds | | [1] 2.06/mol |
| Yield of re-crystallizable product | percent | 75 |

[1] Theoretical=2.

Example 6.—Lauryl bis-acryamido-acetate (=LBAA)

Into a flask provided with a stirrer and a cooler with an azeotropic decanter, there are introduced:

| | Parts |
|---|---|
| Bis-acrylamido-acetic acid | 200 |
| Distilled lauric alcohol | 280 |
| Benzene | 1600 |
| $H_2SO_4$ at 66° Baumé | 22 |

The mixture is heated to boiling and after 5 hours reaction, 24 cm.³ of water are collected.

After cooling to 10° C. and filtration of the precipitate, it is washed with benzene and alcohol. By re-crystallization in alcohol, there are obtained 258 parts of a product having the following characteristics:

| | | |
|---|---|---|
| Melting point | ° C | 154 |
| Double bonds | | [1] 2.14/mol |
| Yield of re-crystallized product | percent | 70 |

[1] Theoretical=2.0.

Example 7.—Oleyl bis-acrylamido-acetate (=OBAA)

Into a flask provided with a stirrer and a cooler with azeotropic decantation, there are introduced:

| | Parts |
|---|---|
| Bis-acrylamido-acetic acid (1 mol) | 200 |
| Distilled oleic alcohol (1.5 mol) | 400 |
| Benzene | 2640 |
| $H_2SO_4$ at 66° Baumé | 22 |

The mixture is brought up to boiling and after 6 hours reaction 22 cm.³ of water are collected.

After stopping the heating, the mixture is allowed to cool and is then filtered. This crude product is washed with benzene and then with alcohol.

After drying at 40° C. under vacuum, there are obtained 370 parts of a product containing 2% of BAAA as an impurity. By re-crystallization in alcohol, there are obtained 310 parts of ester complying with the following characteristics:

| | | |
|---|---|---|
| Melting point | ° C | 155 |
| Double bonds | | [1] 2.96/mol |
| Yield | percent | 69 |

[1] Theoretical=3.

Example 8.—Sulpho-3-propyl bis-acrylamido-acetate $$\begin{array}{c} CH_2=CH-\overset{O}{\overset{\|}{C}}-NH \\ \phantom{CH_2=CH-C-NH\;}CH-\overset{O}{\overset{\|}{C}}-O-CH_2-CH_2-CH_2 \\ CH_2=CH-\overset{O}{\overset{\|}{C}}-NH \phantom{CH-C-O-CH_2-CH_2-CH_2\;\;} SO_3H \end{array}$$

Into a flask provided with a stirrer and a cooler with azeotropic decantation, there are introduced:

| | Parts |
|---|---|
| Bis-acrylamido-acetic acid (1 mol) | 200 |
| 1-propanol-3-sulphonic acid do | 140 |
| Benzene | 2100 |
| $H_2SO_4$ at 66° Baumé | 6 |

This mixture is brought up to boiling and after 5 hours reaction 34 ml. of water are collected.

After the heating is stopped, the mixture is allowed to cool and is then filtered.

The crude product is re-crystallized in alcohol and there are then obtained 231 parts of pure product having the following characteristics:

| | | |
|---|---|---|
| Melting point | ° C | [1] 192 |
| Acidity | percent | 100.6 |
| Yield of re-crystallized product | do | 72.0 |

[1] With decomposition.

Example 9.—Metal salts of bis-acrylamido-acetic acid

The acid which is only slightly soluble in water gives a sodium salt more soluble in water by simple treatment with sodium hydroxide or sodium carbonate.

The potassium salts are also easy to prepare.

By mixing in stoichiometric quantities aqueous solutions of $CoCl_2$ and BAAA, and then evaporating the water under vacuum at 60° C., the cobalt salt is obtained. It is readily soluble in water.

Lead acetate, in stoichiometric proportion is added to a methanol solution of BAAA. After distillation of the methanol under vacuum, the lead salt is obtained. This is much less soluble in water than the cobalt salt.

Example 10.—Polymerization of BAAA

In a 1 litre-flask there are introduced:

| | Grams |
|---|---|
| BAAA | 50 |
| Methanol | 450 |
| Azo-bis-iso-butyronitrile | 0.25 |

The mixture is refluxed (66–68° C.) and is left for 1 hour 30 minutes. There is obtained a precipitate, a polymer of BAAA, which is filtered and dried at room temperature.

The polymer is insoluble in water and in the majority of solvents.

It is non-meltable and decomposes under the action of heat upwards of 100–120° C.

Example 11.—Co-polymers, ethyl acrylate-oleic ester of BAAA (=OBAA)

Into a 1 litre-flask provided with a reflux cooler there are introduced:

I

| | | |
|---|---|---|
| Ethyl acrylate | grams | 267 |
| OBAA | do | 2.70 |
| Laural EC (Lauryl ammonium sulphate) | do | 8.0 |
| Emulphor O [1] | do | 8.0 |
| Water | do | 250 |
| Persulphate ($NH_4$) | do | 0.81 |

II

| | | |
|---|---|---|
| Water | grams | 140 |
| Metabisulphite | do | 0.27 |
| Acetic acid | cm.³ | 0.5 |

[1] Condensation product of oleic alcohol with 20 molecules of ethylene oxide.

At the beginning II+10% of I are introduced and are kept in emulsion by agitation. The insoluble OBAA remains in suspension. The mixture is brought up to reflux (90° C.) and the remainder of I is added in 70 minutes. There is obtained a dispersion of co-polymer.

The long oleic chain gives the ethyl poly-acrylate new properties: flexibility, polymerization in air in the presence of salts of cobalt or of other metals currently employed in siccatives, possibility of forming addition products with maleic anhydride, etc.

*Example 12.—Co-polymers vinyl acetate-sulpho-3-propyl bis-acrylamido-acetate*

The polymerization was carried out in a flask of 2 litres, in the following manner:

I

|  | Grams |
|---|---|
| Vinyl acetate | 530 |
| Sulpho-3-propyl bis-acrylamido-acetate | 10.8 |
| Emulphor 0 (25%) | 12 |
| Laural EC (25%) | 12 |
| Persulphate (0.3%) | 1.62 |
| Water | 340 |

II

|  | Grams |
|---|---|
| Water | 180 |
| Acetic acid | 0.5 |
| Sodium metabisulphite | 0.54 |

Solution II is introduced with 10% of I. The mixture is brought to reflux (78–80° C.) and the remainder is added in one to two hours. A heat treatment is carried out for 30 minutes.

The emulsion obtained is stable and supplies films slightly plastified by the reticulating agent, and the resistance of which to methanol, butyl acetate and methyl-ethyl-ketone is improved.

*Example 13.—Achrylamide BAAA co-polymers*

The following mixture is prepared:

|  | Grams |
|---|---|
| Methanol | 480 |
| Acrylamide | 100 |
| BAAA (1.8%) | 1.8 |
| Azo-bis-iso-butyronitrile | 0.4 |

At the beginning 20% of the charge is introduced into a 1 litre-flask fitted with a stirrer and a reflux cooler. The mixture is heated to reflux (temperature 60° C.). The mixture is left for 15 minutes and the 80% remaining is added in about 1 hour. At the end of the addition, the mixture is left for a further 15 minutes.

The polymer formed in suspension is filtered, washed, dried and ground.

The following proportions of BAAA were employed: 0—1.25—1.8—2.8—3.1—3.3—3.75 and 5% with respect to the acrylamide.

The kinetics of polymerization were not affected by the BAAA.

With an initial 5% of BAAA, there is obtained an insoluble polymer which is therefore too reticulated. Solubilization with an initial 3.75% is already very difficult.

The viscosities of the aqueous solutions at a concentration of 4% were measured and are given in the table below:

| Percent BAAA: | Viscosity in poises of the 4% aqueous solutions at 20° C. |
|---|---|
| 0.0 | 0.075 |
| 1.25 | 0.13 |
| 1.80 | 0.75 |
| 2.80 | 3.00 |
| 3.10 | 27.00 |
| 3.75 | Solution cloudy |

The co-polymers are readily separated in powder form easy to store, while the homo-polymers of acrylamide under the same conditions are in the form of precipitates which tend to become agglomerated, which makes it difficult to dry them.

The viscosity of solutions of poly-acrylamide co-polymerized with BAAA thus increases as the proportion of reticulating agent is higher. This observation is proved up to the point where excess reticulation begins to make the polymer partly insoluble.

The proportions of catalyst can be modified, and these modifications act in the sense prescribed by the conventional theories of polymerization. Any catalyst capable of liberating active radicals on the polymerization reaction can be contemplated.

These products are suitable for various industrial applications: manufacture of paper, flocculation of suspensions or dispersions of all kinds, thickeners, glues, protective colloids in the preparation of emulsions, textile dressings, etc.

We claim:

1. As new products, the N,N-bis-acrylamide-acetic compounds having the formula:

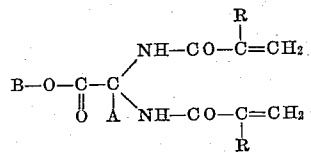

in which A is selected from the group consisting of hydrogen and the alkyl groups including the methyl, ethyl, isopropyl groups;

R is selected from the group consisting of hydrogen and methyl residue;

B is selected from the group consisting of an atom of hydrogen, an atom of a monovalent metal of the group consisting of potassium and sodium and of a polyvalent metal of the group cobalt and lead and a hydrocarbon residue selected from the group consisting of linear aliphatic hydrocarbons, of ramified, saturated and unsaturated aliphatic hydrocarbon groups and of aliphatic hydrocarbon groups substituted by an inorganic group selected from the group consisting of the groups —HSO$_3$, NaSO$_3$, NaSO$_4$, —OH.

2. As a new product, bis-acrylamido-acetic acid.
3. As a new product, the α-methyl bis-acrylamido-acetic acid.
4. As a new product, the n-butyl bis-acrylamido-acetate.
5. As a new product, allyl bis-acrylamido-acetate.
6. As a new product, 2-ethyl-hexyl bis-acrylamido-acetate.
7. As a new product, lauryl bis-acrylamido-acetate.
8. As a new product, sulpho-12-lauryl bis-acrylamido-acetate.
9. As a new product, oleyl bis-acrylamido-acetate.
10. As a new product, sulpho-9-hydroxy-10-oleyl bis-acrylamido-acetate.
11. As a new product, sulpho-3-propyl bis-acrylamido-acetate.
12. The metal salts of bis-acrylamido-acetic acid selected from the group of the salts of sodium, potassium, cobalt and lead.
13. A new composition of matter of detergent material comprising at least one new N,N-bis-acrylamido-acetic compound of the formula:

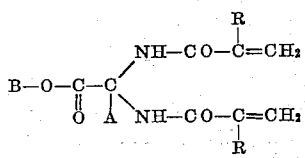

in which A is selected from the group consisting of hydrogen and alkyl groups including the methyl, ethyl, isopropyl groups;

R is selected from the group consisting of hydrogen and methyl residue;

B is selected from the group consisting of an atom of hydrogen an atom of a monovalent metal of the group consisting of potassium and sodium and of a polyvalent metal of the group cobalt and lead and a hydrocarbon residue selected from the group consisting of linear aliphatic hydrocarbons, of ramified, saturated and unsaturated aliphatic hydrocarbon groups and of aliphatic hydrocarbon groups substituted by an inorganic group selected from the group consisting of the groups —HSO$_3$, —NaSO$_3$, —NaSO$_4$, —OH 14. As new composition of matter a detergent material including at least bis - acrylamido - acetic acid.

15. As new composition of matter a detergent material including at least the α - methyl bis - acrylamido - acetic acid.

16. As new composition of matter a detergent material including at least the n - butyl bis - acrylamido - acetate.

17. As new composition of matter a detergent material including at least alkyl bis-acrylamido-acetate.

18. As new composition of matter a detergent material including at least 2 - ethyl - hexyl bis - acrylamido - acetate.

19. As new composition of matter a detergent material including at least lauryl bis - acrylamido - acetate.

20. As new composition of matter a detergent material including at least sulpho - 12 - lauryl bis - acrylamido-acetate.

21. As new composition of matter a detergent material including at least oleyl bis - acrylamido - acetate.

22. As new composition of matter a detergent material comprising at least the bis - acrylamido - acetate of sulpho - 9 - hydroxy - 10 - oleyl.

23. As new composition of matter a detergent material including at least the bis - acrylamido - acetate of sulpho - 3 - propyl.

24. As new composition of matter a detergent material including at least the metallic salts of bis - acrylamido-acetic acid selected from the group of the salts of sodium, potassium, cobalt and lead.

25. New addition polymers including units of bis-acrylamido-acetic acid of the formula:

[HO—CO—C(NH—CO—CH=CH$_2$)$_2$]
              |
              H whereby polymerization takes place through ethylenically unsaturated bonds.

26. New co-polymers comprising units of bis - acrylamido - acetic acid and units of unsaturated co-polymerizable monomer residues.

27. New co-polymers of ethyl acrylate and oleyl bis-acrylamido - acetate.

28. New co-polymer of vinyl acetate and bis - acrylamido acetate of sulpho - 3 - propyl.

29. New co-polymer of acrylamide and bis - acrylamido-acetic acid.

30. As a new composition of matter, a coating composition for textiles and papers and the like, including at least one addition polymer of bis - acrylamido - acetic acid of the formula:

[HO—CO—C(NH—CO—CH=CH$_2$)$_2$]
              |
              H whereby polymerization takes place through ethylenically unsaturated bonds.

31. As a new composition of matter, a coating composition for textiles, papers and the like, comprising at least one co-polymer of bis - acrylamido - acetic acid and residue of co-polymerizable unsaturated monomers.

32. As a new composition of matter, a coating composition for textiles and papers and the like, including at least one co-polymer of ethyl acrylate and oleyl bis-acrylamido-acetate.

33. As a new composition of matter, a coating composition for textiles and papers and the like, including at least one co-polymer of vinyl acetate and bis - acrylamido-acetate of sulpho-3-propyl.

34. As a new composition of matter, a coating composition for textiles and papers and the like, including at least one co-polymer of acrylamide and bis - acrylamido-acetic acid.

35. A method of manufacture of N,N - bis - acrylamido - acetic compounds having the formula:

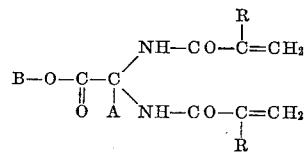

in which A is selected from the group consisting of hydrogen and alkyl groups including the methyl, ethyl, isopropyl groups;

R is selected from the group consisting of hydrogen and methyl residue;

B is selected from the group consisting of an atom of hydrogen, an atom of a monovalent metal of the group consisting of potassium and sodium and of a polyvalent metal of the group cobalt and lead and a hydrocarbon residue selected from the group consisting of linear aliphatic hydrocarbons of the ramified, saturated and unsaturated aliphatic hydrocarbon groups and of the aliphatic hydrocarbon groups substituted by an inorganic group selected from the group consisting of the groups —HSO$_3$, NaSO$_3$, NaSO$_4$, —OH, said method comprising the reaction in an acid medium of at least one molecule of an α - carbonyl acid selected from the group consisting of glyoxylic acid, pyruvic acid, methyl-pyruvic acid, dimethyl - pyruvic acid, with at least two molecules of acrylamide, the condensation of the said at least one molecule of said α - carbonyl acid with at least said two molecules of acrylamide in the presence of an organic solvent selected from the group consisting of solvents forming an azeotrope mixture with water, the elimination of at least one molecule of water and a subsequent stage of treatment selected in the group consisting of a stage of isolation of the free resulting bis - acrylamido - acetic acid, the modification of said free acid by an operation selected from the operations of esterification, salification, polymerization and co-polymerization with another unsaturated co-polymerizable compound.

36. A method in accordance with claim 35, in which said solvent is benzene.

37. A method of manufacture of bis-acrylamido-acetic acid having the formula:

HOCO—C(NH—CO—CH=CH$_2$)$_2$
       |
       H comprising the reaction of glyoxylic acid with acrylamide in benzene in the presence of sulphuric acid and a stabilizing agent selected from the group consisting of copper acetate in a molar ratio of one molecule of glyoxylic acid to two molecules of acrylamide at a temperature of from 73 to 79° C., the elimination of the water in an azeotrope mixture with the benzene, the separation of the resulting bis-acrylamido-acetic acid and the recovery of said acid.

38. A method of manufacture of α-methyl bis-acrylamido-acetic acid having the formula:

HO—CO—C(NH—CO—CH=CH$_2$)$_2$
       |
       CH$_3$ comprising the reaction of pyruvic acid with acrylamide in benzene in the presence of sulphuric acid and a stabilizing agent selected from the group consisting of copper acetate in the molar ratio of one molecule of pyruvic acid to two molecules of acrylamide at the boiling temperature of the reaction mixture, the cooling of said mixture, the separation of the α-methyl bis-acrylamido-acetic acid precipitated and the recovery of said acid.

39. A method of manufacture of n-butyl bis-acrylamido-acetate having the formula:

CH$_3$—CH$_2$—CH$_2$—CH$_2$—O—CO—CH
                              (NH—CO—CH=CH$_2$)$_2$ comprising the esterification of bis-acrylamido-acetic acid with butanol.

40. A method of manufacture of allyl bis-acrylamido-acetate having the formula:

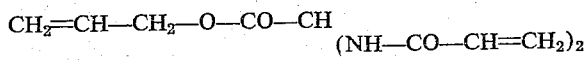
$$CH_2=CH-CH_2-O-CO-CH(NH-CO-CH=CH_2)_2$$

comprising the esterification of bis-acrylamido-acetic acid with allyl alcohol.

41. A method of manufacture of 2-ethyl-hexyl bis-acrylamido-acetate having the formula:

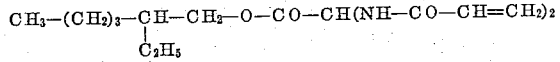
$$CH_3-(CH_2)_3-\underset{\underset{C_2H_5}{|}}{CH}-CH_2-O-CO-CH(NH-CO-CH=CH_2)_2$$

comprising the esterification of bis-acrylamido-acetic acid with 2-ethyl-hexyl alcohol.

42. A method of manufacture of lauryl bis acrylamido-acetate having the formula:

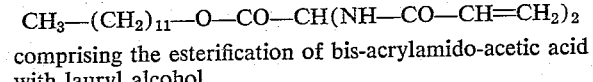
$$CH_3-(CH_2)_{11}-O-CO-CH(NH-CO-CH=CH_2)_2$$

comprising the esterification of bis-acrylamido-acetic acid with lauryl alcohol.

43. A method of manufacture of sulpho-12-lauryl bis-acrylamido-acetate having the formula:

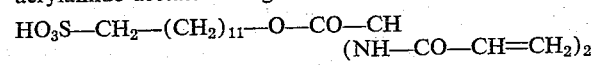
$$HO_3S-CH_2-(CH_2)_{11}-O-CO-CH(NH-CO-CH=CH_2)_2$$

comprising the esterification of bis-acrylamido-acetic acid with lauryl alcohol 12-sulphonic acid.

44. A method of manufacture of oleyl bis-acrylamido-acetate having the formula:

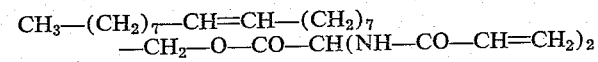
$$CH_3-(CH_2)_7-CH=CH-(CH_2)_7-CH_2-O-CO-CH(NH-CO-CH=CH_2)_2$$

comprising the esterification of bis-acrylamido-acetic acid with oleic alcohol.

45. A method of manufacture of oleyl sulpho-9-hydroxy-10 bis-acrylamido-acetate having the formula:

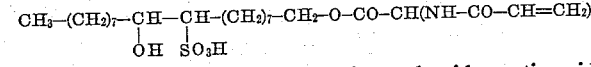
$$CH_3-(CH_2)_7-\underset{\underset{OH}{|}}{CH}-\underset{\underset{SO_3H}{|}}{CH}-(CH_2)_7-CH_2-O-CO-CH(NH-CO-CH=CH_2)_2$$

comprising the esterification of bis-acrylamido-acetic acid with oleic alcohol 10-hydroxy 9-sulphonic acid.

46. A method of manufacture of sulpho-3-propyl bis-acrylamido-acetate having the formula:

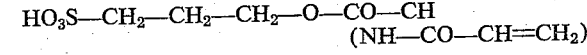
$$HO_3S-CH_2-CH_2-CH_2-O-CO-CH(NH-CO-CH=CH_2)_2$$

comprising the esterification of bis-acrylamido-acetic acid with propanol-1 sulphonic-3 acid.

47. A method of manufacture of the ketal salts, selected from the group consisting of sodium and potassium, of bis-acrylamido-acetic acid, comprising the reaction of said acid in an aqueous medium with an alkaline compound selected from the group consisting of sodium hydroxide, potassium hydroxide, sodium carbonate and potassium carbonate.

48. A method of manufacture of the cobalt salt of bis-acrylamido-acetic acid comprising the reaction of cobalt chloride in an aqueous medium with bis-acrylamido-acetic acid in stoichiometric proportions.

49. A method of manufacture of the lead salt of bis-acrylamido-acetic acid comprising the reaction, in a methanol solution, of bis-acrylamido-acetic acid and lead acetate in stoichiometric proportions.

50. A method of manufacture of polymers of bis-acrylamido-acetic acid comprising heating to reflux of a methanol solution of bis-acrylamido-acetic acid in the presence of a polymerization free radical initiator selected from the group consisting of azo-bis-iso-butyronitrile, the separation of the resulting precipitated polymer and its recovery by filtration and drying at room temperature, whereby a polymer insoluble in water and in organic solvents, non-meltable and decomposing under the action of heat between 100 and 120° C. is obtained.

51. A method of manufacture of co-polymers of bis-acrylamido-acetic acid and its derivatives with at least one unsaturated monomer co-polymerizable therewith, said monomer being selected from the group consisting of ethyl acrylate and oleic ester of bis-acrylamido-acetic acid, vinyl acetate and bis-acrylamido-acetate of sulpho-3-propyl and acrylamide and bis-acrylamido-acetic acid, comprising the co-polymerization by a process selected from the process of co-polymerization in emulsion and in suspension, in the presence of a polymerization free radical initiator selected from the group consisting of azo-bis-iso-butyronitrile, ammonium persulphate and the like.

No references cited.

JOSEPH L. SCHOFER, *Primary Examiner.*

D. K. DENENBERG, *Assistant Examiner.*